3,566,497
CONVEYOR ROLLER
Edmund Lorne Hamlen, 39 Lawrence Ave. E.,
Toronto 12, Ontario, Canada
Filed Aug. 19, 1968, Ser. No. 753,613
Int. Cl. B60b 7/04
U.S. Cl. 29—123          1 Claim

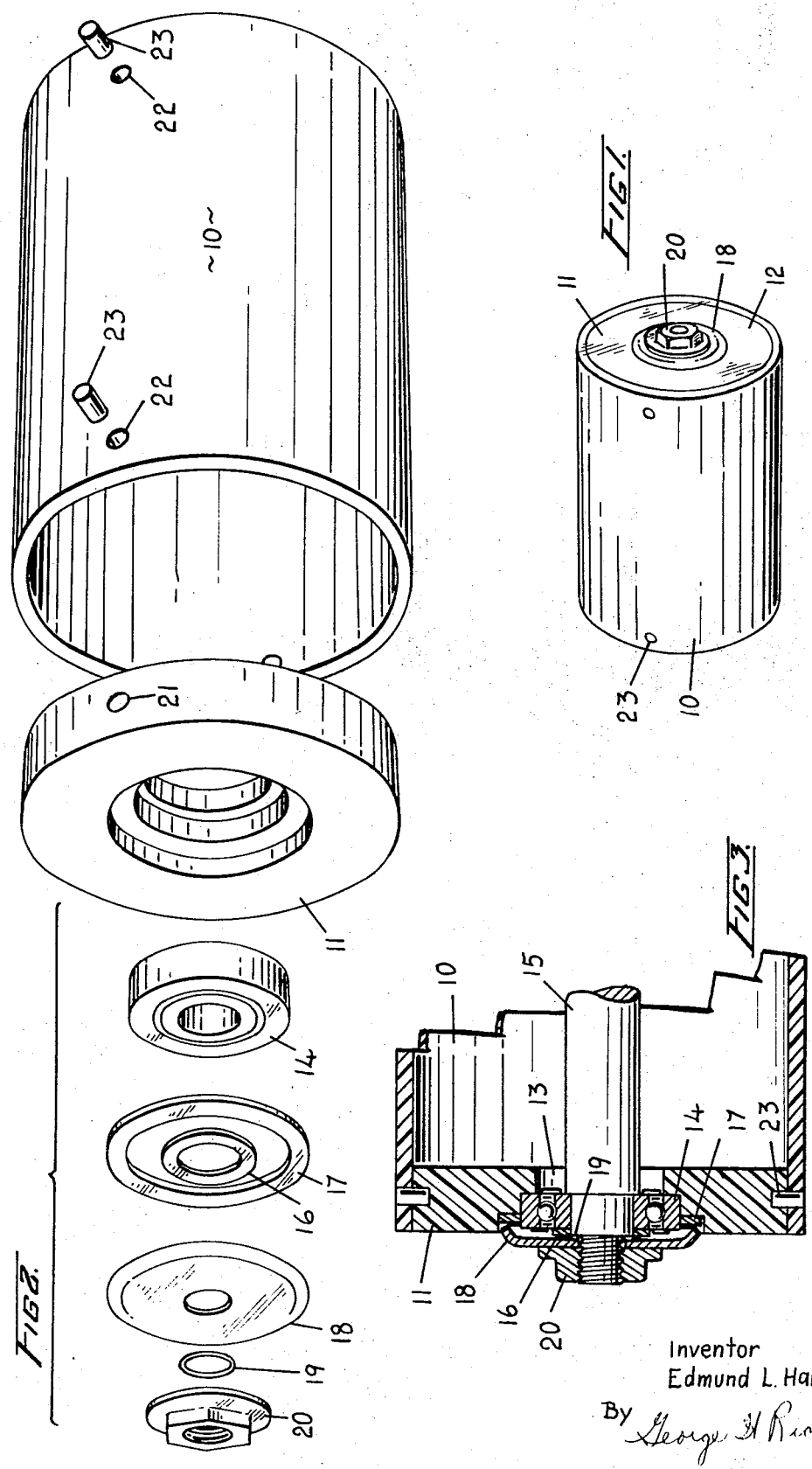

ABSTRACT OF THE DISCLOSURE

A roller for a belt type conveyor having a corrosion resistant non-magnetic tubular member of fibres bonded with a resin, the tubular member being enclosed by resinous end caps. The roller is rotatably mounted on a shaft supported on a support bracket.

BACKGROUND OF THE INVENTION

Heretofore belt type conveyor systems have used rollers made of steel, throughout including the bracket on which the rollers are mounted. Such rollers present problems of severe corrosion in many atmospheres and in cases where corrosive chemicals are used. Further steel rollers, being magnetizable, interfere with the proper and accurate weighing of materials by automatic and magnetic type of continuous weighing devices.

The foregoing problems are solved by the roller of the present invention.

DESCRIPTION OF THE INVENTION

The conveyor roller of the present invention consists of, in combination:

(a) a non-metallic corrosion resistant, non-magnetic tubular member;
(b) a non-metallic corrosion resistant end cap sealed in each end of said tubular member, said end cap having a central bore therethrough; and
(c) a bearing seated in the bore of each end cap and secured therein.

One embodiment of the invention is illustrated in the accompanying drawings in which:

FIG. 1 is a perspective view of a roller constructed in accordance with this invention;

FIG. 2 is an exploded view, in perspective of the roller shown in FIG. 1; and

FIG. 3 is a fragmentary cross sectional view to illustrate the end cap assembly with its related parts.

The roller comprises a tubular member 10, a pair of end caps 11, 12 which are sealed into the tubular member at opposite ends thereof, each cap having an axial bore 13 therethrough; a bearing 14 mounted in each axial bore as shown; a shaft 15 which has its opposite ends journalled in the respective bearings 14; a steel spacer 16; a felt dust excluder 17; a dust shield 18 and an O-ring 19, the whole assembly being held together in assembled position by roller nuts 20, 21.

The tubular member 10 can either be cast or molded in one piece, or by filament winding a tube or by hand layup method and made to the required length of the roller. When filament wound or laid-up by hand the tubular member is made of non-magnetic fibres, such as glass fibres, bonded together by a suitable percentage of a resin selected from the group consisting of polyesters, epoxies, vinyl esters, phenolic acrylonitrile-butadiene-styrene, polyvinyl chloride, polyvinyl di-chloride, or a combination of the same except the last three mentioned which do not require a fibre filler.

The end cap is either cast or molded to the required shape to fit into the open end of the tubular member from a corrosion resistant resin with a suitable filler e.g. fibreglass, silica or vermiculite resin. The end cap is formed with an axial bore therethrough the bore being provided with a seat for the bearing 14 and the dust excluder 17.

The assembly of the roller will now be described. On completion of the forming of the tube 10 and the casting of the end cap, the following steps are required. The end cap bearing seat and its outer periphery are carefully cleaned to remove all existing mold release wax. An epoxy is appplied to the bearing seat and the bearing 14 is pressed into place making sure that it is properly seated. The end cap 11 with bearing is placed on the shaft ensuring that the bearing is seated on the shaft shoulder. The dust excluder is set in place and a few drops of oil is applied to the left.

The following steps are carried out with respect to each end of the shaft. The washer 16 is placed on the bearing and then covered by the dust shield 18 which is pressed down so that it will centre itself into the same recess in which the felt 17 is placed. The nut 20 is placed on the shaft and tightened down so that the dust shield is held in place. For toughening the roller nut, epoxy may be applied on the face of the nut so that when the epoxy sets up nut and dust shield become integral. On completion of the flats on the nuts at each end must be parallel in order to fit into the brackets.

The next step is to clean and roughen both ends of the inner surface of the tube 10 for a distance of approximately two inches. Before inserting the assembly the end cap 11 has its rim coated with epoxy and then inserted into the tubing and centred. The assembly is then placed in a horizontal plane until the epoxy has set up. To ensure that the end caps do not move after assembly a hole of small diameter (⅜ of an inch) is drilled through the tubing and into the end cap as shown at 21, 22 and a pin 23 is then driven thereinto. A suitable pin is made of fibreglass rod.

The preceding description sets forth the installation at one end and to complete the installation at the opposite end the same procedure is followed.

The roller constructed in accordance with the present invention is non-corrosive and non-magnetic. It has a long life under the most severe operating conditions.

It will be apparent to those skilled in the art that the roller of the present invention can be modified by a person skilled in the art without departing from the subject matter of the invention.

What I claim is:

1. A conveyor roller consisting of, in combination:
(a) a corrosion resistant laminate fibre-glass-resin-bonded one piece tubular member open at each end;
(b) a corrosion resistant resinous disc-like end cap permanently secured in each open end of said tubular member, each end cap having a central bore therethrough, and bearing seat formed in said bore;
(c) a bearing permanently secured to said seat to rotate with said end cap; and
(d) a plurality of pins entering through the tubular member at each end and extending radially into the contiguous end cap, the pins of each end cap being uniformly spaced to thereby inhibit relative movement between the tubular member and its end caps.

(References on following page)

References Cited

UNITED STATES PATENTS

| | | | |
|---|---|---|---|
| 1,504,179 | 8/1924 | Bidwell | 29—123 |
| 2,120,875 | 6/1938 | Tatnall | 29—123 |
| 2,615,389 | 10/1952 | Huebner | 29—123 |
| 3,379,591 | 4/1968 | Bradley | 153—173 |
| 3,416,638 | 12/1968 | Buck | 29—148.4(R)X |

FOREIGN PATENTS

| | | | |
|---|---|---|---|
| 976,679 | 12/1964 | Great Britain | 29—148.4R |
| 1,018,864 | 2/1966 | Great Britain | 29—148.4R |

MORRIS KAPLAN, Primary Examiner

U.S. Cl. X.R.

29—129.5, 132